US009149758B2

(12) United States Patent
Park et al.

(10) Patent No.: US 9,149,758 B2
(45) Date of Patent: Oct. 6, 2015

(54) CONTINUOUS OXYGEN PRODUCTION METHOD AND CONTINUOUS OXYGEN ADSORPTION AND DESORPTION DEVICE USING OXYGEN ADSORBING AGENT

(71) Applicant: KOREA INSTITUTE OF ENERGY RESEARCH, Daejeon (KR)

(72) Inventors: Jong-Ho Park, Daejeon (KR); Tae Sung Jung, Daejeon (KR); Hyung Chul Yoon, Daejeon (KR); Young Tae Guahk, Suwon-si (KR); Hee-Tae Beum, Daejeon (KR); Jong-kee Park, Daejeon (KR); Sang-Sup Han, Daejeon (KR); Jong-Nam Kim, Daejeon (KR); Soon-Haeng Cho, Daejeon (KR)

(73) Assignee: KOREA INSTITUTE OF ENERGY RESEARCH (KR)

( * ) Notice: Subject to any disclaimer, the term of this patent is extended or adjusted under 35 U.S.C. 154(b) by 0 days.

(21) Appl. No.: 14/386,351

(22) PCT Filed: Feb. 18, 2013

(86) PCT No.: PCT/KR2013/001241
§ 371 (c)(1),
(2) Date: Sep. 19, 2014

(87) PCT Pub. No.: WO2013/141487
PCT Pub. Date: Sep. 26, 2013

(65) Prior Publication Data
US 2015/0047504 A1 Feb. 19, 2015

(30) Foreign Application Priority Data
Mar. 21, 2012 (KR) .................... 10-2012-0028734

(51) Int. Cl.
*B01D 53/04* (2006.01)
*C01B 13/02* (2006.01)
*B01D 53/047* (2006.01)

(52) U.S. Cl.
CPC ........ *B01D 53/0476* (2013.01); *B01D 53/0423* (2013.01); *C01B 13/0262* (2013.01);
(Continued)

(58) Field of Classification Search
CPC .......... B01D 53/0423; B01D 53/0438; B01D 53/0476; B01D 2251/402; B01D 2251/408; B01D 2251/606; B01D 2253/112; B01D 2253/1124; B01D 2257/102; B01D 2257/104; B01D 2259/402; C01B 13/0262
USPC ................. 95/96, 98, 99, 102, 104, 105, 138; 96/121, 126, 127; 423/219; 252/184, 252/188.28
See application file for complete search history.

(56) References Cited

U.S. PATENT DOCUMENTS

| 3,773,680 A | 11/1973 | Huebler et al. |
| 3,903,010 A | 9/1975 | Massey et al. |

(Continued)

FOREIGN PATENT DOCUMENTS

| JP | H05168839 | 7/1993 |
| JP | 2008012439 | 1/2008 |

(Continued)

OTHER PUBLICATIONS

Machine-generated English translation of JP 2010-012367 A, published Jan. 2010.*

(Continued)

*Primary Examiner* — Frank Lawrence
(74) *Attorney, Agent, or Firm* — Cantor Colburn LLP

(57) ABSTRACT

Provided are a continuous oxygen adsorption and desorption device and an continuous oxygen adsorption and desorption method using the device, and more particularly, an continuous oxygen adsorption and desorption device for producing high-purity oxygen products by using a plurality of adsorption and desorption towers filled with an oxygen-selecting adsorption and desorption agent selected from $BaMg(CO_3)_2$ particles or particles in which either $MgCO_3$ or $Mg(OH)_2$ has been attached to the outside of $BaMg(CO_3)_2$, and also a continuous oxygen adsorption and desorption method using the device.

23 Claims, 7 Drawing Sheets

(52) U.S. Cl.
CPC ....... *B01D53/0438* (2013.01); *B01D 2251/402* (2013.01); *B01D 2251/408* (2013.01); *B01D 2251/606* (2013.01); *B01D 2253/112* (2013.01); *B01D 2253/1124* (2013.01); *B01D 2256/12* (2013.01); *B01D 2257/104* (2013.01); *B01D 2259/402* (2013.01)

(56) References Cited

U.S. PATENT DOCUMENTS

| | | | |
|---|---|---|---|
| 4,092,264 A | | 5/1978 | Tsang et al. |
| 4,560,393 A | * | 12/1985 | Way .................................. 95/68 |
| 4,810,265 A | * | 3/1989 | Lagree et al. .................... 95/101 |
| 4,925,461 A | * | 5/1990 | Gemba et al. ..................... 95/98 |
| 6,030,598 A | * | 2/2000 | Topham et al. ............... 423/581 |
| 6,059,858 A | | 5/2000 | Lin et al. |
| 6,361,584 B1 | | 3/2002 | Stevens et al. |
| 6,866,834 B2 | * | 3/2005 | Nakamura et al. ......... 423/239.1 |

FOREIGN PATENT DOCUMENTS

| | | |
|---|---|---|
| JP | 2010012367 | 1/2010 |
| KR | 1020000031296 | 6/2000 |
| KR | 1020050031597 | 4/2005 |
| KR | 1020110054992 | 5/2011 |
| KR | 1020110119106 | 11/2011 |

OTHER PUBLICATIONS

International Search Report—PCT/KR2013/001241 dated May 9, 2013.

\* cited by examiner

FIG. 3

| | t1 | t2 | t3 | t4 | t5 | t6 |
|---|---|---|---|---|---|---|
| First Tower | Accumulation | Adsorption | Cocurrent Depressuri-zation | Vacuum Desorption | | |
| Second Tower | Vacuum Desorption | | | Accumulation | Adsorption | Cocurrent Depressuri-zation |

FIG. 4

| | t1 | t2 | t3 | t4 | t5 | t6 |
|---|---|---|---|---|---|---|
| First Tower | Adsorption | | | Cocurrent Depressuri-zation | Vacuum Desorption | Accumulation |
| Second Tower | Cocurrent Depressuri-zation | Vacuum Desorption | Accumulation | Adsorption | | |

FIG. 5

| | t1 | t2 | t3 | t4 | t5 | t6 |
|---|---|---|---|---|---|---|
| First Tower | Accumulation | Adsorption | Equalizing Pressure | Cocurrent Depressuri-zation | Vacuum Desorption | Equalizing Pressure |
| Second Tower | Cocurrent Depressuri-zation | Vacuum Desorption | Equalizing Pressure | Accumulation | Adsorption | Equalizing Pressure |

FIG. 6

| Time (second) | t1 | t2 | t3 | t1 | t2 | t3 | t1 | t2 | t3 |
|---|---|---|---|---|---|---|---|---|---|
| Bed A | Accumu-lation | Adsorption | | Cocurrent Depressurization | Cleaning | Desorption | | | Accumu-lation |
| Bed B | Desorption | | Accumulation | Adsorption | | Cocurrent Depressurization | Cleaning | Desorp-tion | |
| Bed C | Cocurrent Depressurization | Cleaning | Desorption | | | Accumulation | Adsorption | | |

FIG. 9
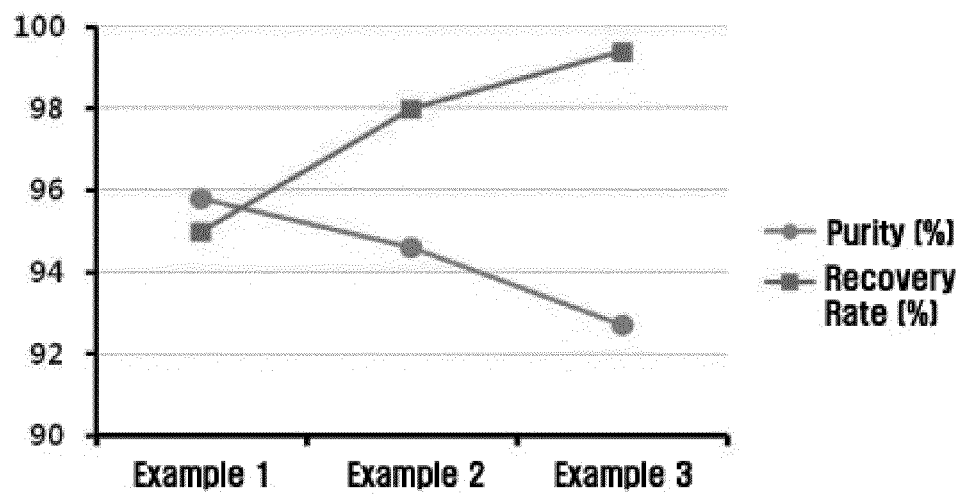
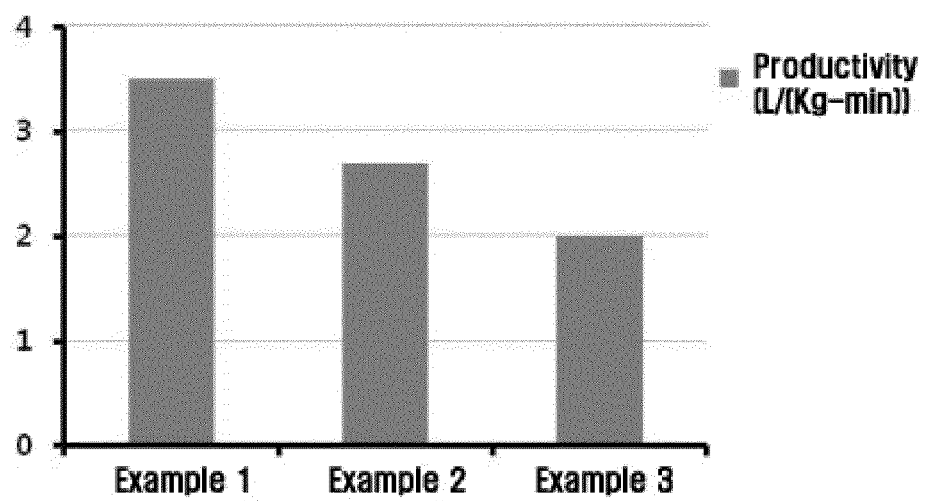

CONTINUOUS OXYGEN PRODUCTION METHOD AND CONTINUOUS OXYGEN ADSORPTION AND DESORPTION DEVICE USING OXYGEN ADSORBING AGENT

TECHNICAL FIELD

The present invention relates to a method and a device for continuously producing oxygen by selectively applying oxygen in the air as an adsorption agent, and more particularly, to a continuous oxygen adsorption and desorption device for producing high-purity oxygen products by using a plurality of adsorption and desorption towers filled with an oxygen-selective adsorption agent produced from particles in which $BaMg(CO_3)_2$ is collected in $MgCO_3$ or $Mg(OH)_2$ or $BaMg(CO3)2$ particles by high temperature firing and a continuous oxygen production method using the device.

BACKGROUND ART

As a technology of separating oxygen in the air, there are an adsorption method, a sub-zero method, a technology using a separation membrane, and the like. The sub-zero method is a technology of separating nitrogen and oxygen by cooling air with cryogenic temperature and the oxygen separation using the separation membrane uses a polymeric separation membrane, a high temperature ceramic separation membrane, and the like for oxygen separation using the separation membrane.

The oxygen separation in the air using adsorption is based on a technology of adsorbing and removing nitrogen in the air and producing high-concentration oxygen by using zeolite as an adsorption agent selectively adsorbing a nitrogen component in the air. A process for selectively adsorbing and removing nitrogen and producing high-concentration oxygen requires an adsorption and desorption tower having a large volume since nitrogen occupying the majority of air is adsorbed and removed and is hardly produce the high-purity oxygen due to low selectivity for nitrogen. Generally, an adsorption separation process using a nitrogen absorption agent is suitable to produce oxygen of 95% or less.

To supplement the disadvantage of the nitrogen-selecting adsorption agent, efforts to develop an adsorption agent selectively adsorbing oxygen at high temperature and produce high-concentration oxygen have been attempted recently.

U.S. Pat. No. 6,361,584 discloses a technology of selectively adsorbing oxygen in the air at high temperature using a metal oxide of $La_{1-y}Sr_yCuO_{4-x}$ and produces high-purity oxygen by reducing a pressure and U.S. Pat. No. 6,059,858 discloses a process of adsorbing oxygen at high temperature by using a metal oxide having a $A_{1-x}M_xBO_{3-d}$ structure and desorbing the adsorbed oxygen by using gas without oxygen.

Barium oxide has been well known as a material which is converted into barium peroxide by reacting to oxygen and thus suffering from oxidation reaction represented by the following Chemical Formula 1 and during the process, adsorbs oxygen and discharges oxygen by a reduction reaction under the atmosphere in which oxygen is not present. Therefore, due to characteristics of the barium oxide, the barium oxide has been used in a process of producing oxygen in the early part of the 20th century.

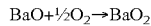
 [Chemical Formula 1]

However, the barium peroxide does not have thermal stability at high temperature and therefore tends to lose oxygen adsorption ability while the cycle is progressed. In more detail, the barium peroxide which is a considerably thermally instable material may cause a sintering phenomenon between particles at high temperature, and therefore a size of the particle is increased and the oxygen adsorption ability is gradually lost while the process is progressed. Therefore, the oxygen-selective adsorption agent which may keep the adsorption ability only when the sintering phenomenon is prevented may be produced. Further, the barium peroxide has excellent reactivity to easily react to other inorganic materials or metal components and therefore loses bonding characteristics with oxygen. Therefore, a structure in which a barium component (barium oxide) selectively adsorbing oxygen may be stably protected is required.

In order to cope with the above problem, various methods have been attempted. In connection with this, U.S. Pat. Nos. 3,773,680 and 3,903,010 disclose that barium oxide is fixed to dolomite to be able to increase utilization and reactivity of barium. In the above U.S. Patents, in order to produce the oxygen-selective adsorption agent, a method for simply mixing barium oxide with a dolomite solid and forming the mixture in a pellet form at a high pressure has been used.

U.S. Pat. No. 4,092,264 discloses that an oxygen adsorption agent having high utilization and stability of barium by impregnating barium oxide into zirconia may be produced. A method for impregnating the barium oxide disclosed in U.S. Pat. No. 4,092,264 is as follows. First, the barium peroxide is impregnated into the zirconia by removing impurities by firing porous zirconia at high temperature, mixing the zirconia with the barium oxide, and heating the acquired mixture. The above patent discloses that when the barium peroxide is impregnated into the zirconia by the above-mentioned method, thermal stability may be improved, since heat generated from the oxidation reaction with oxygen while the oxygen production process is operated is effectively stored and then the heat is used at the time of the reduction reaction, process efficiency may be increased, and when barium of 20% or less is impregnated into zirconia, the thermal stability may be highest and the utilization of barium may also be increased.

According to the above patents, a method for mixing barium peroxide and a third base material with each other or impregnating barium peroxide into a third base material in a dried condition has been mainly used. However, in the case of using the method for mixing barium peroxide and a third base material with each other, a non-uniform protective film is formed and thus the utilization of the barium oxide is not high and in the case of using the method for impregnating barium peroxide into a third base material, a large quantity of material acting as a base material needs to be used, and therefore a material having high oxygen adsorption ability may not be developed.

According to another method, barium oxide may be collected in a frame of magnesium oxide by mixing the barium oxide with the magnesium oxide using a precursor (water-soluble magnesium salt) of magnesium oxide in an aqueous solution and then inducing evaporation of water to form precipitates and performing high temperature firing process on the precipitates. However, the method forms barium hydroxide by reaction between the barium oxide and moisture during the firing process. By the way, since the barium hydroxide has low stability and high reactivity, the method has a problem in that it is difficult to perform the firing and even after the firing is performed, the adsorption ability of oxygen is degraded.

DISCLOSURE

Technical Problem

An object of the present invention is to provide a continuous oxygen production method and a continuous oxygen adsorption and desorption device having high productivity and a high recovery rate using an oxygen-selective adsorption agent which shows high thermal stability and excellent oxygen adsorption ability while adsorbing oxygen in the air faster than the existing oxygen-selective adsorption agent.

Technical Solution

In one general aspect, to achieve the above object of the present invention, a continuous oxygen production method includes:

(a) adsorbing oxygen using an oxygen-selective adsorption agent by supplying new air into a plurality of adsorption and desorption towers filled with an oxygen-selective adsorption agent through a raw material supply pipe and discharging the remaining concentrated nitrogen other than the oxygen;

(b) cocurrent depressurizing an inside of the adsorption and desorption tower adsorbed with the oxygen up to an atmosphere pressure;

(c) vacuum-desorbing the oxygen adsorbed into the adsorption and desorption tower and collecting the vacuum-desorbed oxygen in an oxygen reservoir; and (d) accumulating the inside of the vacuum-desorbed adsorption and desorption tower up to an adsorption pressure by using the concentrated nitrogen discharged during the adsorption process.

The object of the present invention is achieved by continuously producing oxygen by repeatedly performing the steps (a) to (d) in the plurality of towers.

To reduce the amount of concentrated nitrogen used in the accumulation step (d) in the operation method of the process, the method may further include: equalizing a pressure by connecting the adsorption tower in which the adsorbing (a) is completed to the adsorption tower in which the vacuum desorbing (c) is completed prior to cocurrent depressurizing the adsorption and desorption tower in which the adsorbing (a) is completed.

Further, the present invention may perform a process of again re-circulating and rinsing the desorbed oxygen to produce the high-concentration oxygen.

In another general aspect, a method for rinsing primarily purified oxygen and purifying the rinsed oxygen with high-concentration oxygen includes:

(a) adsorbing oxygen using an oxygen-selective adsorption agent by supplying new air into a plurality of adsorption and desorption towers filled with an oxygen-selective adsorption agent through a raw material supply pipe and discharging the remaining concentrated nitrogen other than the oxygen;

(b) cocurrent depressurizing an inside of the adsorption and desorption tower adsorbed with the oxygen up to an atmosphere pressure;

(c) re-circulating some of high-concentration oxygen produced in a desorption process to an inside of the adsorption tower in which the cocurrent depressurization is completed and cleaning a nitrogen component inside the adsorption tower;

(d) vacuum-desorbing the oxygen adsorbed into the adsorption and desorption tower and collecting the vacuum-desorbed oxygen in an oxygen reservoir; and (e) accumulating the inside of the vacuum-desorbed adsorption and desorption tower up to an adsorption pressure by using the concentrated nitrogen discharged during the adsorption process.

To reduce the amount of concentrated nitrogen used in the accumulating (e) in the operation method of the process, the method may further include: equalizing a pressure by connecting the adsorption tower in which the adsorbing (a) is completed to the adsorption tower in which the vacuum desorbing (d) is completed prior to cocurrent pressurizing the adsorption and desorption tower in which the adsorbing (a) is completed.

In the starting of the purification process of oxygen according to the exemplary embodiment of the present invention, the high-concentration oxygen in the step (c) may not be supplied, but the overall process is stabilized and then the high-concentration oxygen in the step (c) may be smoothly supplied.

The continuous oxygen adsorption and desorption method having the adsorption and desorption process of oxygen for each step as described above may be individually performed on each adsorption and desorption tower, complete the oxygen adsorption process of one period in which oxygen is adsorbed to each adsorption and desorption tower, and then repeatedly perform a periodic and continuous oxygen adsorption and desorption process according to the supply of oxygen mixing gas.

The adsorption agent filled inside the adsorption and desorption tower according to the exemplary embodiment of the present invention may use the oxygen-selective adsorption agent produced by forming and high-temperature firing $BaMg(CO_3)_2$ particles or particles in which $BaMg(CO_3)_2$ is collected in $MgCO_3$ or $Mg(OH)_2$.

Hereinafter, the method for producing an oxygen-selective adsorption agent according to the exemplary embodiment of the present invention will be described in detail.

First, the particles in which the $BaMg(CO_3)_2$ is collected in the $MgCO_3$ or the $Mg(OH)_2$ or the $BaMg(CO_3)_2$ particles may be produced.

The $BaMg(CO_3)_2$ may be a solid solution of the $BaCO_3$ and the $MgCO_3$ and is found in nature minerals and is called norsethite. As a method for synthesizing the material, there are various methods such as a method for producing the material by mixing $BaCO_3$ with $MgCO_3$ and firing the mixture at 500° C. or more, a method for synthesizing the $BaCO_3$ in an aqueous solution of $MgCl_2$ and $NaHCO_3$, a method for producing the material using $MgCO_3 3H_2O$ instead of the $MgCl_2$ as a source of $Mg^{2+}$ in the method for synthesizing the $BaCO_3$ in an aqueous solution of $MgCl_2$ and $NaHCO_3$, and a method for producing the material by adding $CO_3^{2-}$ to an aqueous solution in which $Ba^{2+}$ and $Mg^{2+}$ are present.

According to the exemplary embodiment of the present invention, the $BaMg(CO_3)_2$ particles may be produced by dispersing a mixture of a barium containing compound and carbonate in distilled water and then adding a magnesium carbonate precursor and may be produced by other methods.

According to the exemplary embodiment of the present invention, the particles in which $MgCO_3$ or $Mg(OH)_2$ is attached outside the $BaMg(CO_3)_2$ may be produced by acquiring particles produced by dispersing the mixture of the barium containing compound and the carbonate in the distilled water and then adding the magnesium carbonate precursor, filtering and cleaning it, and again dispersing it in the distilled water, adding the magnesium carbonate precursor, performing ultrasonic treatment thereon, and adding ammonia water thereto and may be produced by other methods.

The $MgCO_3$ or the $Mg(OH)_2$ in the particles in which the $BaMg(CO_3)_2$ is collected in the $MgCO_3$ or the $Mg(OH)_2$ may be attached outside the $BaMg(CO_3)_2$ at a molar ratio of 1 to 10 with respect to the $BaMg(CO_3)_2$.

When the oxygen-selective adsorption agent by high-temperature firing the particles in which the $BaMg(CO_3)_2$ is collected in the $MgCO_3$ or the $Mg(OH)_2$ is produced, the oxygen-selective adsorption agent having excellent thermal stability may be produced.

According to the exemplary embodiment of the present invention, the barium containing component may be $BaCO_3$ or $BaCl_2$ but is not limited thereto.

According to the exemplary embodiment of the present invention, as the carbonate mixed with the barium containing component, carbonate including a $CO_2^{2-}$ source such as $Na_2CO_3$ may be used without being limited.

According to the exemplary embodiment of the present invention, the magnesium carbonate precursor may be $Mg(CO_2)_2 6H_2O$ or $MgCO_2 3H_2O$, but is not necessarily limited thereto.

Next, the particles in which the $BaMg(CO_3)_2$ is collected in the $MgCO_3$ or the $Mg(OH)_2$ or the $BaMg(CO_3)_2$ particles produced in the above step may be fired at high temperature.

According to the exemplary embodiment of the present invention, the particles in which the $BaMg(CO_3)_2$ is collected in the $MgCO_3$ or the $Mg(OH)_2$ or the $BaMg(CO_3)_2$ particles may be fired at a temperature of 700 to 800° C. under the hydrogen atmosphere or may be fired at a temperature of 900 to 1200° C. under the oxygen atmosphere.

As described above, when the particles in which the $BaMg(CO_3)_2$ is collected in the $MgCO_3$ or the $Mg(OH)_2$ or the $BaMg(CO_3)_2$ particles are fired, the $MgCO_3$ present in the $BaMg(CO_3)_2$ may be easily oxidized at 500° C. or less and may be converted to magnesium oxide, but the $BaCO_3$ may be converted to barium oxide under the oxygen atmosphere of 900° C. or more or the hydrogen atmosphere of 800° C. or less.

The firing of the $BaMg(CO_3)_2$ particles or the particles in which the $BaMg(CO_3)_2$ is collected in the $MgCO_3$ or the $Mg(OH)_2$ which are used in the present invention may be achieved by firing the $BaMg(CO_3)_2$ particles or the particles in which $BaMg(CO_3)_2$ is collected in $MgCO_3$ or $Mg(OH)_2$ outside the adsorption and desorption towers or by firing the $BaMg(CO_3)_2$ particles or the particles in which $BaMg(CO_3)_2$ is collected in $MgCO_3$ or $Mg(OH)_2$ which may be filed in the adsorption and desorption towers before the firing process.

According to the exemplary embodiment of the present invention, it is most preferable to selectively adsorb and desorb the oxygen at 500 to 900° C.

Further, according to the present invention, a continuous oxygen adsorption and desorption device includes:

a plurality of adsorption and desorption towers connected to a raw material supply pipe;

an oxygen-selective adsorption agent filled in the adsorption and desorption tower;

a heating part for controlling a temperature of the adsorption and desorption tower;

a vacuum pump connected to the adsorption and desorption tower; and an oxygen reservoir in which oxygen desorbed from the adsorption and desorption tower is collected.

At least two adsorption and desorption towers may be arranged in parallel to perform the continuous oxygen production while each step process such as the adsorption, the cocurrent depressurization, the vacuum desorption, and the accumulation for the mixing gas supplied to each adsorption and desorption tower through the raw material supply pipe is performed.

The oxygen-selective adsorption agent according to the exemplary embodiment of the present invention may be the particles in which $BaMg(CO_3)_2$ is collected in $MgCO_3$ or $Mg(OH)_2$ or the $BaMg(CO_3)_2$ particles.

The continuous oxygen adsorption and desorption device may further include a flow rate controller between the raw material supply pipe and the adsorption and desorption tower to inject a predetermined amount of air into the adsorption and desorption tower.

Advantageous Effects

According to the exemplary embodiments of the present invention, it is possible to obtain the higher productivity and the higher recovery rate than the existing oxygen production device using the nitrogen-selecting adsorption agent (zeolites), by performing the vacuum desorption using the particles in which $BaMg(CO_3)_2$ is collected in the $MgCO_3$ or $Mg(OH)_2$ as the oxygen-selective adsorption agent or the $BaMg(CO_3)_2$ particles. Further, the adsorption agent used in the present invention has the high oxygen selectivity, and therefore oxygen having a purity of 95% or more which may not be achieved by the existing process of using a nitrogen-selecting adsorption agent may also be produced.

DESCRIPTION OF DRAWINGS

FIG. 3 is a table showing a continuous oxygen adsorption and desorption process period using the 2-bed continuous oxygen adsorption and desorption device according to the exemplary embodiment of the present invention.

FIG. 4 is a diagram illustrating a configuration of a process of continuously performing an adsorption process as another example of the continuous oxygen adsorption and desorption process period using the 2-bed continuous oxygen adsorption and desorption device according to the exemplary embodiment of the present invention.

FIG. 5 is a diagram illustrating a configuration of a process of performing cocurrent depressurization using an equalizing process as another example of the continuous oxygen adsorption and desorption process period using the 2-bed continuous oxygen adsorption and desorption device according to the exemplary embodiment of the present invention.

FIG. 6 is a diagram illustrating a configuration of a process suitable to produce high-purity oxygen of 95% or more as another example of the continuous oxygen adsorption and desorption process period using the continuous oxygen adsorption and desorption device according to the exemplary embodiment of the present invention.

FIG. 9 is a graph illustrating a purification result and productivity of oxygen depending on the continuous oxygen adsorption and desorption according to examples 1 to 3 of the present invention.

DETAILED DESCRIPTION OF MAIN ELEMENTS

Figure 1:
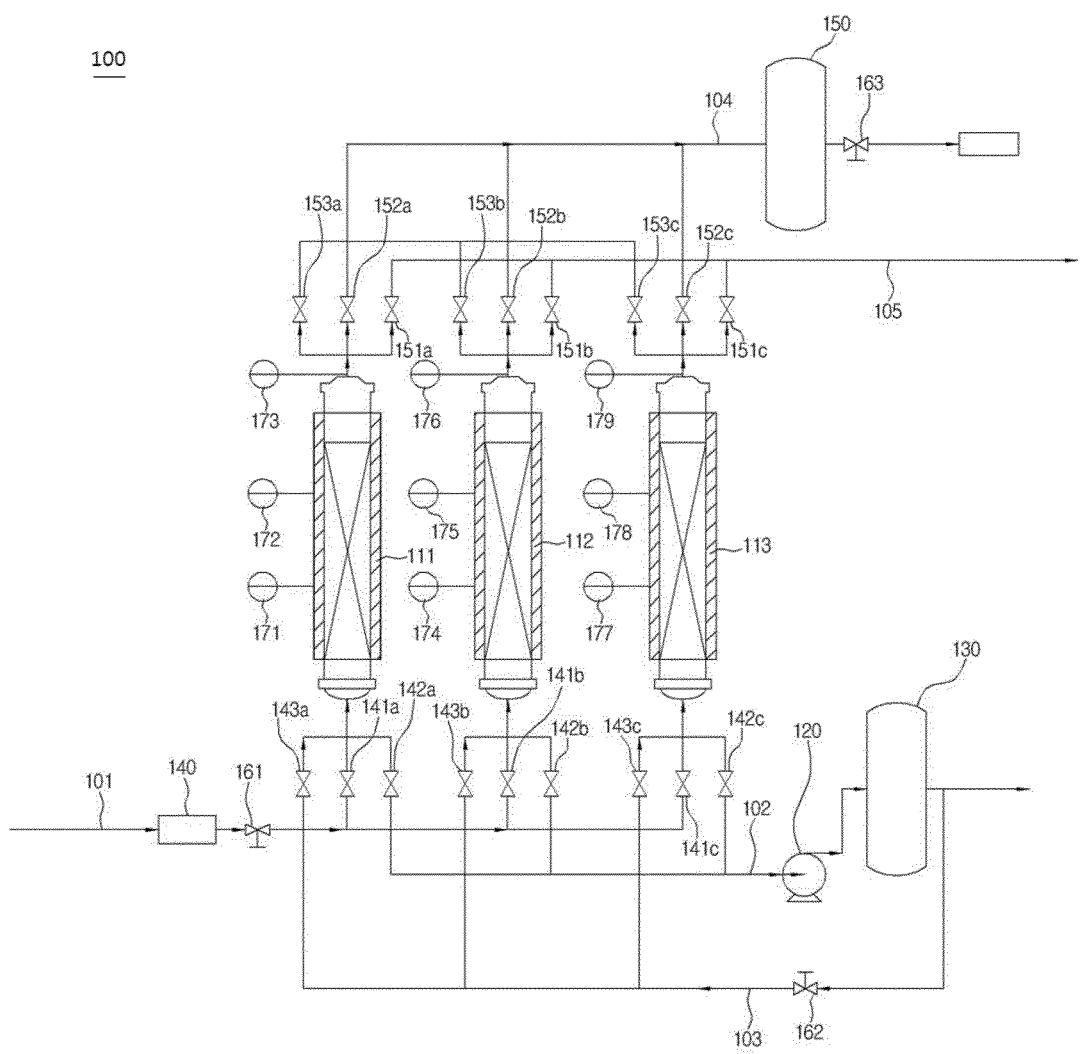
FIG. 1 is a conceptual diagram of a 3-bed continuous oxygen adsorption and desorption device according to an exemplary embodiment of the present invention.

100: Continuous oxygen adsorption and desorption device
111~113: Adsorption and desorption tower
120: Vacuum pump
130: Oxygen reservoir 140: flow rate controller 150: Accumulator 141a to 141c: Supply valve 142a to 142c: Vacuum valve 143a to 143c: Oxygen supply valve 151a to 151c: Recovery valve 152a to 152c: Accumulation valve 153a to 153c: Equalizing valve 163: Pressure control valve 161 to 163: Valve 101 to 105: Line 171 to 179: Heating part

BEST MODE

[Configuration of Continuous Oxygen Adsorption and Desorption Device]

First, FIG. 1 is a configuration diagram of a continuous oxygen adsorption and desorption device according to an exemplary embodiment of the present invention.

As illustrated in FIG. 1, a continuous oxygen adsorption and desorption device 100 according to an exemplary embodiment of the present invention is configured to include: a plurality of adsorption and desorption towers 111 to 113 which are connected to a raw material supply pipe 101; a vacuum pump 120 which is connected between the raw material supply pipe 101 and the adsorption and desorption towers 111 to 113 to individually maintain the flow rate controller 140 and the plurality of adsorption and desorption towers 111 to 113 in a vacuum state; an oxygen reservoir 130 in which oxygen products recovered from the adsorption and desorption towers 111 to 113 are stored, a plurality of valves 141a to 144c, 151a to 154c, and 161 which open and close a plurality of pipes 101 to 105 connecting among the adsorption and desorption towers 111 to 113, the oxygen reservoir 130, and the vacuum pump 120; and heating parts 171 to 179 which are mounted outside the plurality of adsorption and desorption towers 111 to 113 to control a temperature of the adsorption and desorption towers.

The adsorption and desorption towers 111 to 113 are configured of first to third adsorption and desorption towers 111 to 113 of which the at least two adsorption and desorption towers are disposed in parallel and lower ends of each adsorption and desorption tower 111 to 113 are each connected to the raw material supply pipe 101 supplied with mixed gas including oxygen gas through the first to third supply valves 141a to 141c.

Further, lower portions of the adsorption and desorption towers 111 to 113 are connected to the vacuum pump 120 through first to third vacuum valves 142a to 142c other than the first to third supply valves 141a to 141c which are mounted on the raw material supply pipe 101.

The oxygen products purified by the first to third adsorption and desorption towers 111 to 113 are collected in the oxygen reservoir 130 through the vacuum valves 142a to 142c connected to each adsorption and desorption tower 111 to 113 and the vacuum pump 120 connected to the vacuum valve in series and the oxygen products individually purified by each adsorption and desorption tower 111 to 113 are introduced into each adsorption and desorption towers 111 to 113 through an oxygen product cleaning pipe 103 by individually opening and closing oxygen supply valves 143a to 143c during cleaning steps for each adsorption and desorption tower 111 to 113.

A sequential continuous oxygen adsorption and desorption process using the continuous oxygen adsorption and desorption device having the above technical configuration will be described in more detail with reference to the following process drawings.

Meanwhile, insides of the first to third adsorption and desorption towers 111 to 113 are filled with an oxygen-selective adsorption agent for adsorbing only oxygen from oxygen mixing gas.

The adsorption agent filled within the first to third adsorption and desorption towers 111 to 113 is filled with the oxygen-selective adsorption agent selected from $BaMg(CO_3)_2$ particles or particles in which $BaMg(CO_3)_2$ is collected in $MgCO_3$ or $Mg(OH)_2$.

When an adsorption function of the adsorption agents is performed on the oxygen mixing gas, since the adsorption agents selectively adsorb only oxygen component included in the oxygen mixing gas, high-purity oxygen products may be produced by the adsorption agent filled in each adsorption and desorption tower 111 to 113.

[Continuous Oxygen Adsorption and Desorption Method Using Continuous Oxygen Adsorption and Desorption Device]

FIG. 6 is a table showing one process period of an oxygen purification method using a pressure swing adsorption device according to an exemplary embodiment of the present invention.

The purification process for selectively adsorbing or desorbing oxygen from the oxygen mixing gas will be described in detail with reference to a configuration diagram of the pressure swing adsorption device of FIG. 1 described above and FIG. 6.

The continuous oxygen adsorption and desorption process described herein will be described based on a 3-bed continuous process using three adsorption and desorption towers as illustrated in FIG. 1.

First, the adsorption and desorption tower 111 uses some of nitrogen concentration gas discharged during the adsorption process to perform accumulation up to a pressure at which the adsorption may be performed. In this case, a valve 152a is in an opened state and all of other valves of the adsorption and desorption tower 111 are in a closed state. While the adsorption and desorption tower 111 performs the accumulation, the adsorption and desorption tower 112 and the adsorption and desorption tower 113 each perform desorption and cocurrent depressurization. In this case, only the valve 142b connected to the vacuum pump among the valves connected to the adsorption and desorption tower 112 is in an opened state and only a valve 151c connected to the adsorption and desorption tower 113 is in an opened state.

When a pressure of the adsorption and desorption tower 111 is boosted up to a pressure at which the adsorption may be performed, the adsorption and desorption tower 111 performs an adsorption step. In this case, air as raw material gas is supplied into the first adsorption and desorption tower 111 through the raw material supply pipe 101. In this case, since only the first supply valve 141a connected to the first adsorption and desorption tower 111 among the supply valves 141a to 141c is in an opened state and the valve 152a is also in an opened state, nitrogen concentration gas from which oxygen is removed is discharged through the valve 152a. While the adsorption and desorption tower 111 performs the adsorption step, the adsorption and desorption tower 112 continuously performs the above-mentioned desorption step and the adsorption and desorption tower 113 in which the cocurrent depressurization is completed performs the cleaning operation using oxygen products. In this case, the valve 143c and the valve 151c among the valves connected to the adsorption and desorption tower 113 are opened.

While the adsorption and desorption tower 111 performs the adsorption step, when the desorption of the adsorption and desorption tower 112 is completed, the adsorption and desorption tower 112 enters an accumulation step at which a pressure is boosted to an adsorption pressure. Gas required for the accumulation is supplied from the reservoir 150 in which the concentrated nitrogen obtained in the adsorption step is stored. In this case, only the valve 152*b* among the valves connected to the adsorption and desorption tower 112 is opened. When the adsorption and desorption tower 112 completes the desorption, the adsorption and desorption tower 113 completes the cleaning step and the adsorption and desorption tower 113 performs the desorption. In this case, only the valve 142*c* connected to the vacuum pump among the valves connected to the adsorption and desorption tower 113 is opened.

When the adsorption and desorption tower 111 completes the adsorption step, to remove nitrogen components present inside the adsorption and desorption tower, the cocurrent depressurization is performed. In this case, the nitrogen components are discharged through a first recovery valve 151*a* opened over the first adsorption and desorption tower 111 and a recovery pipe 105. By this process, nitrogen among the air components present inside the adsorption and desorption tower is selectively discharged outside the adsorption and desorption tower, and as a result the oxygen concentration within the adsorption and desorption tower is increased. While the adsorption and desorption tower 111 performs the cocurrent depressurization, the adsorption and desorption tower 112 and the adsorption and desorption tower 113 continuously perform the accumulation and the desorption.

When the first adsorption and desorption tower 111 completes the cocurrent depressurization, a cleaning valve 143*a* under the first adsorption and desorption tower 111 is opened and the high-concentration oxygen present in the oxygen reservoir 130 is re-circulated to the first adsorption and desorption tower to clean the nitrogen component therein. In this case, exhaust gas is discharged to the outside through the valve 151*a*. When the adsorption and desorption tower 111 completes the cocurrent depressurization, the adsorption and desorption tower 112 ends the accumulation step and enters the adsorption step. When the adsorption and desorption tower 112 performs the adsorption, the valve 141*b* and the valve 152*b* are opened, and at that time, the discharged nitrogen concentration gas is introduced into the reservoir 150 through the pipe 104. The adsorption and desorption tower 113 continuously performs the vacuum desorption step during the process.

When the first adsorption and desorption tower 111 completes the cleaning step, the valve 151*a* and the valve 143*a* are closed and the vacuum valve 142*a* between the lower portion of the first adsorption and desorption tower 111 and the vacuum pump 120 is opened, the inside of the first adsorption and desorption tower 111 undergoes countercurrent depressurization to an atmospheric pressure or less, and the desorption step of making the oxygen adsorbed to the adsorption agent inside the first adsorption and desorption tower 111 be collected in the oxygen reservoir 130 is performed. During the process, the adsorption and desorption tower 112 continuously performs the adsorption step and the adsorption and desorption tower 113 enters the accumulation step after completing the desorption. In this accumulation step, the valve 152*c* is opened and the high-concentration nitrogen gas present in the gas reservoir 150 is introduced into the adsorption and desorption tower 113.

While the adsorption and desorption tower 111 performs the desorption step, when the adsorption and desorption tower 112 completes the adsorption, the adsorption and desorption tower 112 closes the valve 141*b* and the valve 152*b* and opens the valve 151*b* and thus enters the cocurrent depressurization step. When the adsorption and desorption tower 112 completes the cocurrent depressurization, the valves 143*b* and 151*b* are opened and thus the adsorption and desorption tower 112 performs the cleaning step. When the adsorption and desorption tower 112 completes the cocurrent depressurization, the adsorption and desorption tower 113 ends the accumulation step and opens the valves 141*c* and 152*c* to perform the adsorption step.

When the adsorption and desorption tower 111 ends the desorption step, only the valve 152*a* among the valves connected to the adsorption and desorption tower 111 is opened to perform the accumulation step. When the adsorption and desorption tower 111 ends the desorption step, the adsorption and desorption tower 112 ends the cleaning step and opens only the valve 142*b* to perform the desorption step. During the process, the adsorption and desorption tower 113 continuously performs the adsorption step.

The above-mentioned one period operation is periodically and repeatedly performed to be able to produce the high-purity oxygen.

[Continuous Oxygen Adsorption and Desorption Method Using Continuous Oxygen Adsorption and Desorption Device]

FIG. 3 is a table showing another one process period of an oxygen purification method using a pressure swing adsorption device according to an exemplary embodiment of the present invention. FIG. 3 illustrates an operation method for continuously producing oxygen in the process configured in the 2 bed type, in which the purification process for selectively adsorbing or desorbing oxygen from the oxygen mixing gas will be described in detail below with reference to the configuration diagram of the pressure swing adsorption device of FIG. 2 as described above and FIG. 3.

First, the adsorption and desorption tower 111 uses some of the nitrogen concentration gas stored in the gas reservoir 150 among the nitrogen concentration gas discharged during the adsorption process to perform the accumulation up to the pressure at which the adsorption may be performed. In this case, a valve 152*a* is in an opened state and all of other valves of the adsorption and desorption tower 111 are in a closed state. When the adsorption and desorption tower 111 performs the accumulation, the adsorption and desorption tower 112 performs the desorption step. In this case, only the valve 142*b* connected to the vacuum pump among the valves connected to the adsorption and desorption tower 112 is in an opened state. The high-concentration oxygen obtained in the desorption is stored in the oxygen reservoir 130 through the vacuum pump 120.

When the pressure of the adsorption and desorption tower 111 is boosted up to a pressure at which the adsorption may be performed, the adsorption and desorption tower 111 performs an adsorption step. In this case, air as raw material gas is supplied into the first adsorption and desorption tower 111 through the raw material supply pipe 101. In this case, since only the first supply valve 141*a* connected to the first adsorption and desorption tower 111 among the supply valves 141*a* and 141*b* is in an opened state and the valve 152*a* is also in an opened state, the nitrogen concentration gas from which oxygen is removed is discharged through the valve 152*a* and is thus introduced into the gas reservoir 150. When the adsorption and desorption tower 111 performs the adsorption step, the adsorption and desorption tower 112 continuously performs the desorption step.

When the adsorption and desorption tower 111 completes the adsorption step, to remove nitrogen components present inside the adsorption and desorption tower, the cocurrent depressurization is performed. In this case, the nitrogen components are discharged through a first recovery valve 151a opened over the first adsorption and desorption tower 111 and a recovery pipe 105. By this process, nitrogen among the air components present inside the adsorption and desorption tower is selectively discharged outside the adsorption and desorption tower, and as a result the oxygen concentration within the adsorption and desorption tower is increased. When the adsorption and desorption tower 111 performs the cocurrent depressurization, the adsorption and desorption tower 112 continuously performs the desorption step.

When the first adsorption and desorption tower 111 completes the cocurrent depressurization step, the valve 151a is closed and the vacuum valve 142a between the lower portion of the first adsorption and desorption tower 111 and the vacuum pump 120 is opened, the inside of the first adsorption and desorption tower 111 undergoes the countercurrent depressurization to the atmospheric pressure or less, and the desorption step of making the oxygen adsorbed to the adsorption agent inside the first adsorption and desorption tower 111 be collected in the oxygen reservoir 130 is performed. When the adsorption and desorption tower 111 completes the cocurrent depressurization, the adsorption and desorption tower 112 completes the desorption and enters the accumulation step using the high-concentration nitrogen gas stored in the gas reservoir 150. In this accumulation step, the valve 152b is opened and the high-concentration nitrogen gas present in the gas reservoir 150 is introduced into the adsorption and desorption tower 112.

While the adsorption and desorption tower 111 performs the desorption step, when the adsorption and desorption tower 112 completes the accumulation, the adsorption and desorption tower 112 closes the valve 152b and opens the valve 141b and the valve 152b and thus enters the adsorption step. In this case, air is introduced into the adsorption and desorption tower 112 through the pipe 101. The air introduced into the adsorption and desorption tower 112 is removed by adsorbing oxygen to the adsorption agent and the high-concentration nitrogen from which oxygen is removed is introduced into the gas reservoir 150 through the pipe 104.

While the adsorption and desorption tower 111 performs the desorption step, when the adsorption and desorption tower 112 completes the adsorption step, the adsorption and desorption tower 112 closes the valve 141b and the valve 152b and opens the valve 151b and thus enters the cocurrent depressurization step. Only the nitrogen among the air components present inside the adsorption and desorption tower 112 while the adsorption and desorption tower 112 performs the cocurrent depressurization is selectively discharged and thus the oxygen concentration inside the adsorption and desorption tower is increased.

While the adsorption and desorption tower 111 performs the desorption step, when the adsorption and desorption tower 112 completes the adsorption step, the adsorption and desorption tower 112 closes the valve 141b and the valve 152b and opens the valve 151b and thus enters the cocurrent depressurization step. Only the nitrogen among the air components present inside the adsorption and desorption tower 112 while the adsorption and desorption tower 112 performs the cocurrent depressurization is selectively discharged and thus the oxygen concentration inside the adsorption and desorption tower is increased.

When the adsorption and desorption tower 111 completes the desorption, one period operation ends and the above-mentioned one period operation is again performed repeatedly, thereby producing the high-purity oxygen.

Hereinafter, Inventive Example will be provided in order to assist in the understanding of the present invention. However, it will be obvious to those skilled in the art that the following Inventive Example is only an example of the present invention and various modifications and alterations may be made without departing from the scope and spirit of the present invention. In addition, these modifications and alterations will fall within the following claims.

[Production Example 1] Production of Oxygen-Selective Adsorption Agent]

The oxygen-selective adsorption agent was produced by a method of dispersing a mixture of 8 g of $BaCO_3$ and 8 g of $Na_2CO_3$ in 200 cc of distilled water and then slowly adding a solution in which magnesium nitrate ($Mg(NO_3)_2 \cdot 6H_2O$, 20 g) is melted in 100 cc of distilled water to the dispersion solution (Ba/Mg molar ratio=0.5). In this case, a solution in which $BaCO_3$ and $NaCO_3$ are melted was maintained at 90° C. Next, the obtained $BaMg(CO_3)_2$ particles undergone the filtering and cleaning processes and then were collected and an electron photomicrograph thereof was illustrated in FIG. 7. The oxygen-selective adsorption agent according to the present invention was produced by firing the obtained particles by an electric furnace at a temperature of 900° C. for 10 hours under the oxygen atmosphere.

[Production Example 2] Production of Oxygen-Selective Adsorption Agent]

The oxygen-selective adsorption agent was produced by a method of dispersing a mixture of 8 g of $BaCO_3$ and 4 g of $Na_2CO_3$ in 200 cc of distilled water and then slowly adding a solution in which magnesium nitrate ($Mg(NO_3)_2 6H_2O$, 10 g) is melted in 100 cc of distilled water to the dispersion solution (Ba/Mg molar ratio=1). In this case, a solution in which $BaCO_3$ and $Na_2CO_3$ are melted was maintained at 90° C. Next, the obtained particles undergone the filtering and cleaning processes and then were collected. 5 g of particles obtained by the above process were dispersed in distilled water (100 ml) and then 10 g of magnesium nitrate was melted in the solution and undergone ultrasonic treatment. The $Mg(OH)_2$ was formed by slowly adding ammonia water to the ultrasonic treated solution and was thus coated on the $BaMg(CO_3)_2$ and the electron photomicrograph thereof was illustrated in FIG. 2. The oxygen-selective adsorption agent according to the present invention was produced by firing the obtained particles by an electric furnace at a temperature of 900° C. for 10 hours under the oxygen atmosphere.

Figure 7:
FIG. 7 is an electron photomicrograph of an oxygen-selective adsorption agent produced according to production example 1 of the present invention.
Figure 8:
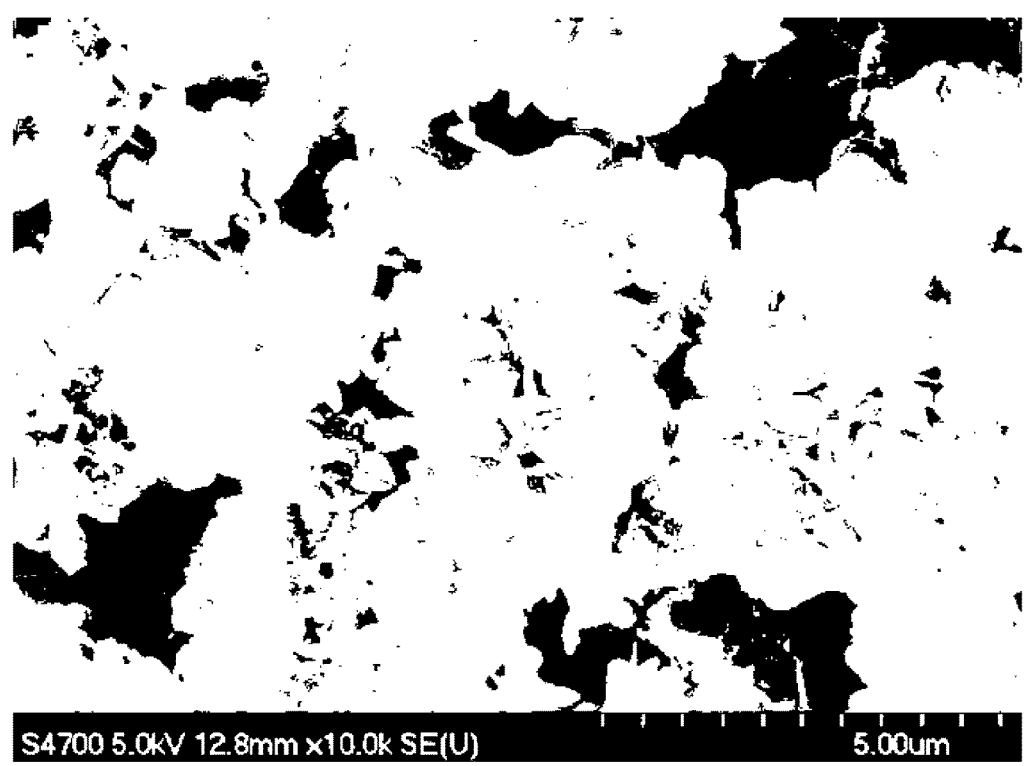
FIG. 8 is an electron photomicrograph of an oxygen-selective adsorption agent produced according to production example 2 of the present invention.

Referring to FIG. 7, in the production example 1, it may be appreciated that the $BaMg(CO_3)_2$ particles were produced in an angled quadrangular particle form and referring to FIG. 8, in the production example 2, it may be appreciated that particles attached in a form in which a flake-shaped $Mg(OH)_2$ encloses the $BaMg(CO_3)_2$ were produced. It was observed that a size of the $BaMg(CO_3)_2$ particles produced in the above production examples 1 and 2 and a size of particles in which $Mg(OH)_2$ is attached to the outside of $BaMg(CO_3)_2$ are about 1 to 5 micron.

[Production Example 3] Forming of Oxygen-Selective Adsorption Agent]

The particles produced in the above production example 2 were dried in a vacuum oven of 120° C. and then were finally fired at 500° C. for 5 hours. Particles having a size of 100 micron or less among the fired particles were acquired by sieving, added with 5 wt % of high-viscosity CMC and 30 cc of water, and then were kneaded. The dough was produced in a pellet form, fired under the oxygen atmosphere of 550° C. to oxidize and remove the CMC, and again fired at 700° C. The finally formed oxygen-selective adsorption agent was produced by performing the above process on the dough and then finally firing the dough at 750° C. for 5 hours under the hydrogen atmosphere.

EXAMPLE 1

Figure 2:
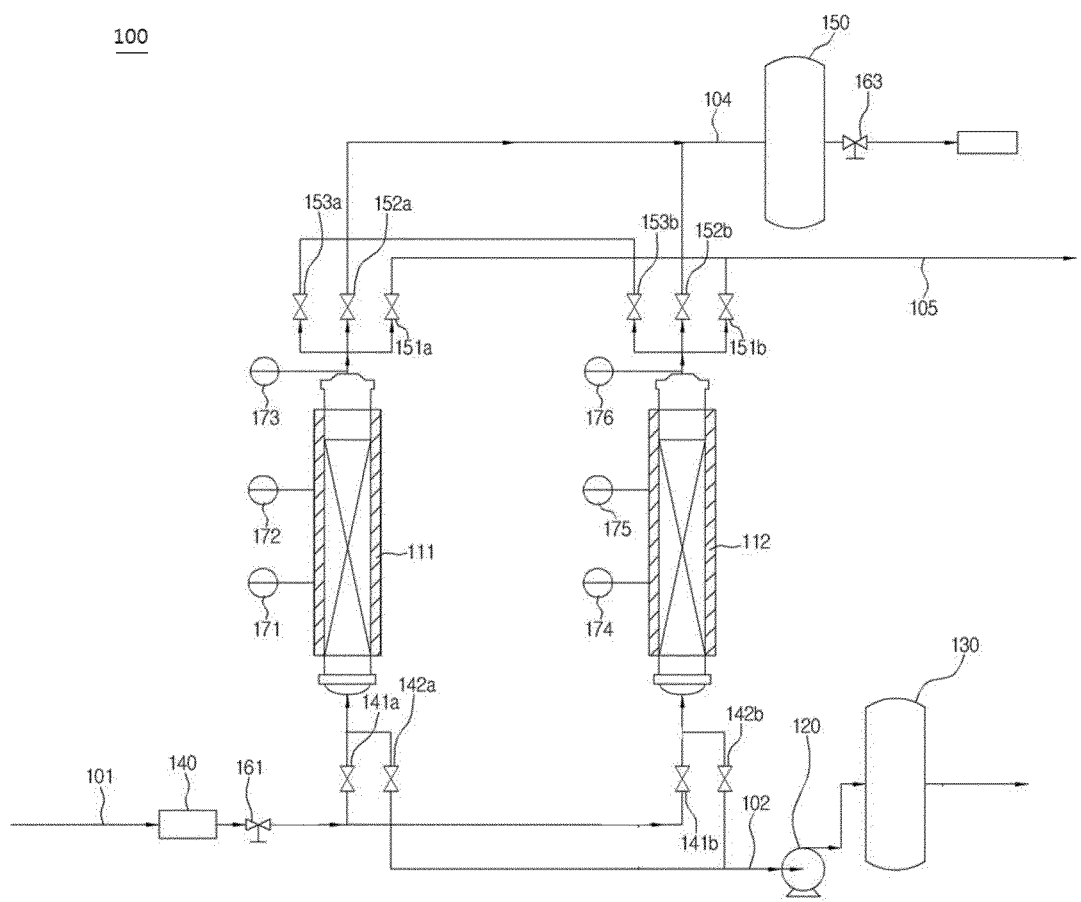
FIG. 2 is a conceptual diagram of a 2-bed continuous oxygen adsorption and desorption device according to an exemplary embodiment of the present invention.

The continuous oxygen adsorption and desorption experiment illustrated in FIG. 2 by using the device of FIG. 1 was performed under the following conditions.

Flow rate of raw material (oxygen mixing gas): 10 SLM
Raw material composition: 78.03 vol. % of nitrogen, 20.99 vol. % of oxygen, 0.93 vol. % of argon, 0.03 vol. % of carbon dioxide, 0.02 vol. % of others.
Raw material temperature: Normal temperature (21° C.)
Adsorption temperature: 750° C.
Desorption temperature: 750° C.
Process period: 240 seconds
Final pressure of adsorption and desorption towers for each step: accumulation (10 seconds)/11 atm, adsorption (100 seconds)/11 atm, cocurrent depressurization (10 seconds)/1 atm, vacuum depressurization (120 seconds)/0.1 atm.

EXAMPLE 2

Except that the flow rate of the raw material (oxygen mixing gas) is changed to 8 SLM, the continuous oxygen adsorption and desorption experiment was performed under the same conditions as the above Example 1.

EXAMPLE 3

Except that the flow rate of the raw material (oxygen mixing gas) is changed to 5 SLM, the continuous oxygen adsorption and desorption experiment was performed under the same conditions as the above Example 1.

The purification result of oxygen depending on the continuous oxygen adsorption and desorption of the above Examples 1 to 3 was illustrated in the following FIG. 9. As illustrated in FIG. 9, the high-concentration pure oxygen may be produced at the high recovery rate by the continuous oxygen adsorption and desorption and the oxygen according to the exemplary embodiment of the present invention may be controlled by controlling the desired concentration and recovery rate in response to the change in the flowing flow rate at the time of producing the oxygen.

The invention claimed is:

1. A continuous oxygen production method, comprising:
(a) adsorbing oxygen using an oxygen-selective adsorption agent by supplying new air into a plurality of adsorption and desorption towers filled with an oxygen-selective adsorption agent, which is $BaMg(CO_3)_2$ particles or particles in which $BaMg(CO_3)_2$ is collected in $MgCO_3$ or $Mg(OH)_2$, through a raw material supply pipe and discharging the remaining concentrated nitrogen other than the oxygen;
(b) cocurrent depressurizing an inside of the adsorption and desorption tower adsorbed with the oxygen up to an atmosphere pressure;
(c) vacuum-desorbing the oxygen adsorbed into the adsorption and desorption tower and collecting the vacuum-desorbed oxygen in an oxygen reservoir; and
(d) accumulating the inside of the vacuum-desorbed adsorption and desorption tower up to an adsorption pressure by using the concentrated nitrogen discharged during the adsorption process.

2. The continuous oxygen production method of claim 1, further comprising:
equalizing a pressure by connecting the adsorption and desorption tower in which the adsorbing (a) is completed to the adsorption and desorption tower in which the vacuum desorbing (c) is completed prior to cocurrent depressurizing the adsorption and desorption tower in which the adsorbing (a) is completed.

3. The continuous oxygen production method of claim 1, wherein the $BaMg(CO_3)_2$ particles are produced by dispersing a mixture of a barium containing compound and carbonate in distilled water, adding a magnesium carbonate precursor, and undergoing a firing process.

4. The continuous oxygen production method of claim 1, wherein the particles in which the $BaMg(CO_3)_2$ is collected in the $MgCO_3$ or the $Mg(OH)_2$ are particles in which the $MgCO_3$ or the $Mg(OH)_2$ is attached outside the $BaMg(CO_3)_2$ at a molar ratio of 1 to 10 with respect to the $BaMg(CO_3)_2$.

5. The continuous oxygen production method of claim 3, wherein the particles in which the $BaMg(CO_3)_2$ is collected in the $MgCO_3$ or the $Mg(OH)_2$ are produced by acquiring particles produced by dispersing the mixture of the barium containing compound and the carbonate in the distilled water and then adding the magnesium carbonate precursor, filtering and cleaning the particles and again dispersing the particles in the distilled water, adding the carbonate magnesium precursor, adding ammonia water thereto, and undergoing the firing process.

6. The continuous oxygen production method of claim 3, wherein the barium containing compound is $BaCO_3$ or $BaCl_2$, the carbonate is $Na_2CO_3$, and
the magnesium carbonate precursor is $Mg(NO_3)_2 6H_2O$ or $MgCO_3 3H_2O$.

7. The continuous oxygen production method of claim 3, wherein the firing process is performed under an oxygen atmosphere of 900 to 1200° C. or a hydrogen atmosphere of 700 to 800° C.

8. The continuous oxygen production method of claim 1, wherein the adsorption of oxygen in the step (a) is performed at 500 to 900° C.

9. The continuous oxygen production method of claim 1, wherein the vacuum desorption of oxygen in the step (c) is performed at 500 to 900° C.

10. A continuous oxygen production method, comprising:
(a) adsorbing oxygen using an oxygen-selective adsorption agent which is $BaMg(CO_3)_2$ particles or particles in which $BaMg(CO_3)_2$ is collected in $MgCO_3$ or $Mg(OH)_2$ by supplying new air into a plurality of adsorption and desorption towers filled with the oxygen-selective adsorption agent through a raw material supply pipe and discharging the remaining concentrated nitrogen other than the oxygen;
(b) cocurrent depressurizing an inside of the adsorption and desorption tower adsorbed with the oxygen up to an atmosphere pressure;
(c) re-circulating some of high-concentration oxygen produced in a desorption process to an inside of the adsorption and desorption tower in which the cocurrent depressurization is completed and cleaning a nitrogen component inside the adsorption and desorption tower;
(d) vacuum-desorbing the oxygen adsorbed into the adsorption and desorption tower and collecting the vacuum-desorbed oxygen in an oxygen reservoir; and
(e) accumulating the inside of the vacuum-desorbed adsorption and desorption tower up to an adsorption pressure by using the concentrated nitrogen discharged during the adsorption process.

11. The continuous oxygen production method of claim 10, further comprising:
equalizing a pressure by connecting the adsorption and desorption tower in which the adsorbing (a) is completed to the adsorption and desorption tower in which the vacuum desorbing (d) is completed prior to cocurrent pressurizing the adsorption and desorption tower in which the adsorbing (a) is completed.

12. A continuous oxygen adsorption and desorption device, comprising:
    a plurality of adsorption and desorption towers connected to a raw material supply pipe;
    an oxygen-selective adsorption agent filled in the plurality of adsorption and desorption towers;
    a heating part for controlling a temperature of the plurality of adsorption and desorption towers;
    a vacuum pump connected to the plurality of adsorption and desorption towers; and
    an oxygen reservoir in which oxygen desorbed from the plurality of adsorption and desorption towers is collected,
    wherein the oxygen-selective adsorption agent is $BaMg(CO_3)_2$ particles or particles in which $BaMg(CO_3)_2$ is collected in $MgCO_3$ or $Mg(OH)_2$.

13. The continuous oxygen adsorption and desorption device of claim 12, wherein the $BaMg(CO_3)_2$ particles are produced by dispersing a mixture of a barium containing compound and carbonate in distilled water, adding a magnesium carbonate precursor, and undergoing a firing process.

14. The continuous oxygen adsorption and desorption device of claim 12, wherein the particles in which the $BaMg(CO_3)_2$ is collected in the $MgCO_3$ or the $Mg(OH)_2$ are particles in which the $MgCO_3$ or the $Mg(OH)_2$ is attached outside the $BaMg(CO_3)_2$ at a molar ratio of 1 to 10 with respect to the $BaMg(CO_3)_2$.

15. The continuous oxygen adsorption and desorption device of claim 13, wherein the particles in which the $BaMg(CO_3)_2$ is collected in the $MgCO_3$ or the $Mg(OH)_2$ are produced by acquiring particles produced by dispersing the mixture of the barium containing compound and the carbonate in the distilled water and then adding the magnesium carbonate precursor, filtering and cleaning the particles and again dispersing the particles in the distilled water, adding the carbonate magnesium precursor, adding ammonia water thereto, and undergoing the firing process.

16. The continuous oxygen adsorption and desorption device of claim 13, wherein the barium containing compound is $BaCO_3$ or $BaCl_2$,
    the carbonate is $Na_2CO_3$, and
    the magnesium carbonate precursor is $Mg(NO_3)_2 6H_2O$ or $MgCO_3 3H_2O$.

17. The continuous oxygen adsorption and desorption device of claim 12, wherein at least two adsorption and desorption towers are arranged in parallel.

18. The continuous oxygen adsorption and desorption device of claim 12, further comprising:
    a flow rate controller between the raw material supply pipe and the plurality of adsorption and desorption towers.

19. The continuous oxygen production method of claim 5, wherein the barium containing compound is $BaCO_3$ or $BaCl_2$,
    the carbonate is $Na_2CO_3$, and
    the magnesium carbonate precursor is $Mg(NO_3)_2 6H_2O$ or $MgCO_3 3H_2O$.

20. The continuous oxygen production method of claim 5, wherein the firing process is performed under an oxygen atmosphere of 900 to 1200° C. or a hydrogen atmosphere of 700 to 800° C.

21. The continuous oxygen adsorption and desorption device of claim 15, wherein the barium containing compound is $BaCO_3$ or $BaCl_2$,
    the carbonate is $Na_2CO_3$, and
    the magnesium carbonate precursor is $Mg(NO_3)_2 6H_2O$ or $MgCO_3 3H_2O$.

22. The continuous oxygen adsorption and desorption device of claim 13, wherein the firing process is performed under an oxygen atmosphere of 900 to 1200° C. or a hydrogen atmosphere of 700 to 800° C.

23. The continuous oxygen adsorption and desorption device of claim 15, wherein the firing process is performed under an oxygen atmosphere of 900 to 1200° C. or a hydrogen atmosphere of 700 to 800° C.

* * * * *